United States Patent
Riemers (10) Patent No.: US 8,341,229 B2
(45) Date of Patent: Dec. 25, 2012

(54) IMAP FETCH DIFF

(75) Inventor: Bill C. Riemers, Stoney Creek (CA)

(73) Assignee: Red Hat, Inc., Raleigh, NC (US)

( * ) Notice: Subject to any disclaimer, the term of this patent is extended or adjusted under 35 U.S.C. 154(b) by 616 days.

(21) Appl. No.: 12/323,369

(22) Filed: Nov. 25, 2008

(65) Prior Publication Data

US 2010/0131603 A1    May 27, 2010

(51) Int. Cl.
*G06F 15/16* (2006.01)
(52) U.S. Cl. .............. 709/206; 709/205; 709/207
(58) Field of Classification Search .............. 709/200, 709/204, 205, 206, 207, 232; 719/310
See application file for complete search history.

(56) References Cited

U.S. PATENT DOCUMENTS

| | | | |
|---|---|---|---|
| 6,360,272 B1 * | 3/2002 | Lincke et al. | 709/238 |
| 6,701,346 B1 * | 3/2004 | Klein | 709/206 |
| 7,155,725 B1 * | 12/2006 | Kister et al. | 719/310 |
| 7,577,656 B2 * | 8/2009 | Kawai et al. | 1/1 |
| 7,856,417 B2 * | 12/2010 | Bauchot et al. | 707/613 |
| 2002/0099775 A1 * | 7/2002 | Gupta et al. | 709/205 |
| 2009/0204903 A1 * | 8/2009 | Edelen et al. | 715/752 |

* cited by examiner

*Primary Examiner* — Ruolei Zong
(74) *Attorney, Agent, or Firm* — Lowenstein Sandler PC (57) ABSTRACT

An apparatus and a method for processing messages at a mail server. In one embodiment, the mail server receives and compares at least two messages, where each message has a same message identifier. The mail server generates a single message having the same message identifier and a differential message based on the comparison of the messages. The single message and the differential message are delivered to a mail client where the single message is assembled with the differential message.

9 Claims, 5 Drawing Sheets

IMAP FETCH DIFF

TECHNICAL FIELD

Embodiments of the present invention relate to computing systems, and more particularly, to retrieving messages from an email server.

BACKGROUND

As computer networks have developed into a means of structuring, sharing and transferring information, information systems such as electronic mail (email) have facilitated communication and information management. Users on a computer network generally use email to communicate messages with each other. Computer networks used by organizations typically comprise email servers. The email server is a computer hardware platform where application software responsible for receiving, transmitting, routing and archiving emails resides. Users of such a computer network typically have client versions of an email application software for creating, sending, receiving and organizing emails.

However, emails with the same message ID can result in multiple redundant emails. Each email can have a different header, and sometimes even different message bodies. Such redundant multiple emails limit network bandwidth.

BRIEF DESCRIPTION OF THE DRAWINGS

The present invention is illustrated by way of example, and not by way of limitation, in the figures of the accompanying drawings and in which.

DETAILED DESCRIPTION

Described herein is a method and apparatus for processing messages at a mail server. In one embodiment, the mail server receives and compares at least two messages, where each message has a same message identifier. The mail server generates a single message having the same message identifier and a differential message based on the comparison of the messages. The single message and the differential message are delivered to a mail client where the single message is assembled with the differential message.

Figure 1:
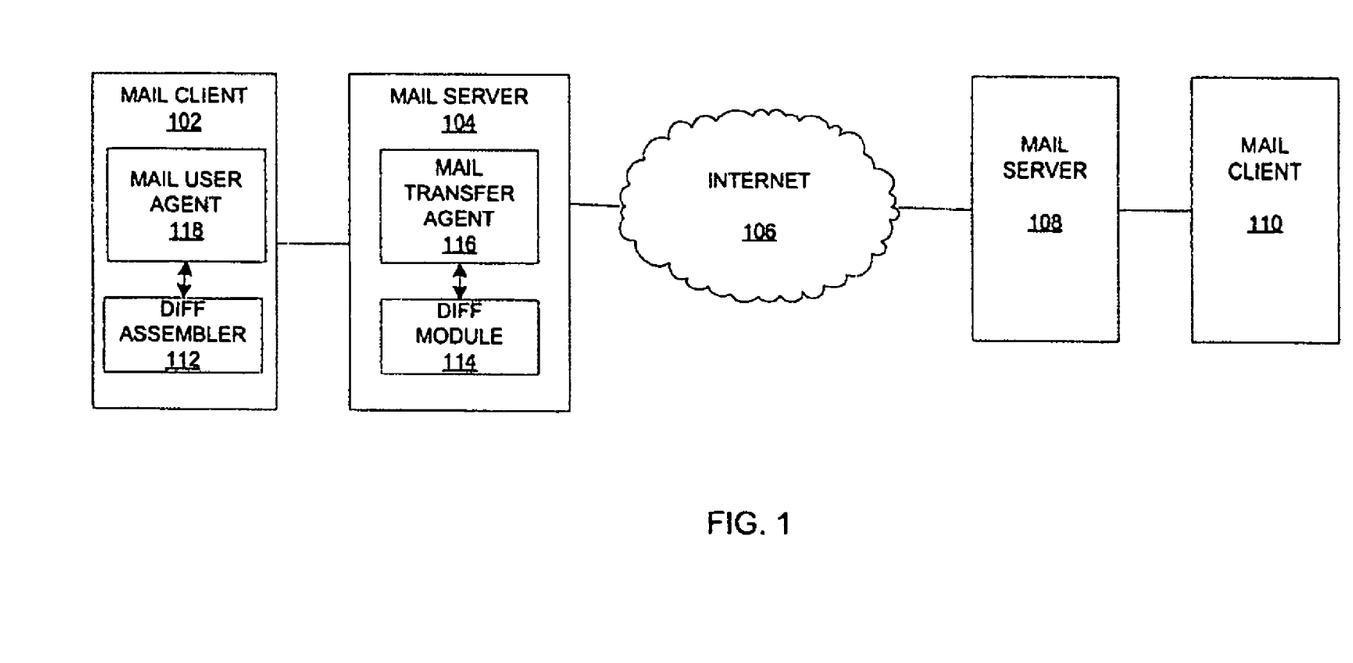
FIG. 1 is a block diagram illustrating one embodiment of a system for processing messages.

FIG. 1 is a block diagram illustrating one embodiment of a system for processing messages. A mail client 102 communicates with a mail server 104. Mail server 104 communicates with another mail server 108 via a network such as the Internet 106. Mail server 108 delivers and receives messages to and from mail client 110.

In one embodiment, mail client 102 includes a Mail User Agent 118 (MUA) used to manage email and to communicate with an email server such as mail server 104. In another embodiment, mail client 102 also includes a web application that provides the relevant email functionality.

Mail client 102 also includes a diff assembler module 112 configured to assemble a message received from mail server 104. The operations of diff assembler module 112 is further discussed below with respect to FIG. 2. Those of ordinary skills in the art will recognize that diff is a file comparison utility that outputs the differences between two files, or the changes made to a current file by comparing it to a former version of the same file. Diff displays the changes made per line for text files. The output is called a diff or a patch since the output can be applied with the Unix program patch. The output of similar file comparison utilities are also called a "diff".

Like most client programs, MUA 118 is only active when a user runs it. Messages arrive on the mail server 104. Unless the MUA 118 has access to the mail server 104 storage, messages are stored on a remote server and the MUA has to request them on behalf of the user.

In the first case, shared disk, a user logs on a server and runs a MUA on that machine. The MUA reads messages from a conventionally formatted storage, typically mbox, within the user's HOME directory. The MTA uses a suitable Mail Delivery Agent (MDA) to add messages to that storage, possibly in concurrence with the MUA. This is the default setting on many Unix systems. Webmail applications running on the relevant server can also benefit from direct disk access to the mail storage.

For personal computing, and whenever messages are stored on a remote system, MUA 118 connects to a remote mailbox to retrieve messages. Access to remote mailboxes comes in two variations. On the one hand, the Post Office Protocol (POP) allows the client to download messages one at a time and only delete them from the server after they have been successfully saved on local storage. It is possible to leave messages on the server in order to let another client download them. However, there is no provision for flagging a specific message as seen, answered, or forwarded. Thus POP is not convenient for users who access the same mail from different machines or clients. On the other hand, the Internet Message Access Protocol (IMAP) allows users to keep messages on the server, flagging them as appropriate. IMAP provides sub-folders. Typically, the Sent, Drafts, and Trash folders are created by default.

Both POP and IMAP clients can be configured to access more mailboxes at the same time, as well as to check each mailbox every given number of minutes. IMAP features an idle extension for real time updates, that may work better than polling when long lasting connections are feasible.

In one embodiments mail server 104 includes a Mail Transfer Agent (MTA) 116 configured to transfer emails from one computer to another. Mail server 104 also includes a diff module 114. Diff module 114 is configured to receive at least two messages with each message having a same message identifier, to compare the at least two messages, and to generate a single message having the same message identifier and a differential message based on the comparison of the at least two messages. The details of the operation of diff module 114 are further discussed with respect to FIG. 2.

MTA 116 receives mail from another MTA (relaying) or from MUA 118. MTA 116 works behind the scenes, while the user usually interacts with the MUA 118. Every time MTA 116 receives an e-mail, it will add a "Received:" trace header field to the top of the message. In this way, there is a record of which MTAs handled the e-mail and in which order. Upon final delivery, the "Return-Path:" header will also be added to record the return path. The delivery of e-mail to a user's mailbox typically takes place via a mail delivery agent (MDA).

Figure 2:
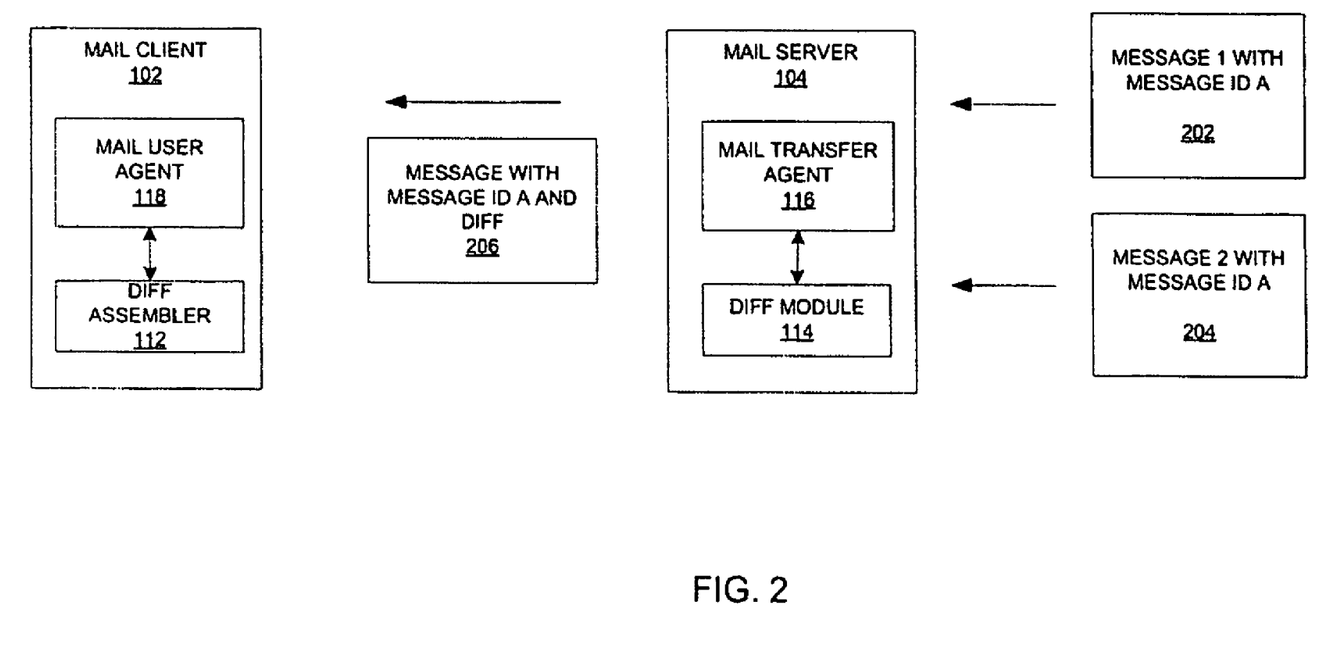
FIG. 2 is a block diagram illustrating one embodiment of a mail server and a mail client processing two messages with the same message identifier.

FIG. 2 is a block diagram illustrating one embodiment of a mail server and a mail client processing two messages with the same message identifier. Mail server 104 receives a first message 202 and a second message 202 with both having the same message ID. For example, first message 202 includes the following:

---

Date: Wed, 17 Jul 1996 02:23:25 -0700 (PDT)
From: Terry Gray <gray@cac.washington.edu>
Subject: IMAP4rev1 WG mtg summary and minutes
To: imap@cac.washington.edu
cc: minutes@CNRI.Reston.VA.US, John Klensin <KLENSIN@MIT.EDU>
Message-Id: <B27397-0100000@cac.washington.edu>
MIME-Version: 1.0
Content-Type: TEXT/PLAIN; CHARSET=US-ASCII
Hi Bob,
Long time no see.  Give me a call when you get a chance. In regards to our last conversion, you were right about the European Swallows. Can you check the African Swallows?
  Bill

---

The following is an example of a similar message such as second message 202:

---

Date: Wed, 17 Jul 1996 02:23:25 -0700 (PDT)
From: Terry Gray <gray@cac.washington.edu>
Subject: IMAP4rev1 WG mtg summary and minutes
To: imap@cac.washington.edu
cc: minutes@CNRI.Reston.VA.US, John Klensin <KLENSIN@MIT.EDU>
Message-Id: <B27397-0100000@cac.washington.edu>
List-Id: minutes@CNRI.Reston.VA.US
Reply-To: minutes@CNRI.Reston.VA.US
MIME-Version: 1.0
Content-Type: TEXT/PLAIN; CHARSET=US-ASCII
Hi Bob,
Long time no see.  Give me a call when you get a chance. In regards to our last conversion, you were right about the European Swallows. Can you check the African Swallows?
  Bill
--
Email: minutes-admin@cnri.reston.va.us to unsubscribe.

---

In one embodiment, MTA 116 receives the first and second messages 202, 204, each having the same message ID. Diff module 114 compares the two messages 202, 204, and generates a single message 206 having the same message ID with a differential message based on the comparison of the two messages 202, 204. The following is an example of an output generated by the diff protocol:

---

S:   * OK IMAP4rev1 Service Ready
C:   a001 login mrc secret
S:   a001 OK LOGIN completed
C:   a002 select inbox
S:   * 18 EXISTS
S:   * FLAGS (\Answered \Flagged \Deleted \Seen \Draft)
S:   * 2 RECENT
S:   * OK [UNSEEN 17] Message 17 is the first unseen message
S:   * OK [UIDVALIDITY 3857529045] UIDs valid
S:   a002 OK [READ-WRITE] SELECT completed
C:   a003 fetch 12 full
S:   * 12 FETCH (FLAGS (\Seen) INTERNALDATE "17-Jul-1996 02:44:25 -0700" RFC822.SIZE 4286 ENVELOPE ("Wed, 17 Jul 1996 02:23:25 -0700 (PDT)" "IMAP4rev1 WG mtg summary and minutes"
(("Terry Gray" NIL "gray" "cac.washington.edu"))
(("Terry Gray" NIL "gray" "cac.washington.edu"))
(("Terry Gray" NIL "gray" "cac.washington.edu"))
((NIL NIL "imap" "cac.washington.edu"))
((NIL NIL "minutes" "CNRI.Reston.VA.US")
("John Klensin" NIL "KLENSIN" "MIT.EDU")) NIL NIL
"<B27397-0100000@cac.washington.edu>")
BODY ("TEXT" "PLAIN" ("CHARSET" "US-ASCII") NIL NIL "7BIT" 3028 92))
S:   a003 OK FETCH completed
C:   a004 fetch 12 body[header]
S:   * 12 FETCH (BODY[HEADER] {342}
S:   Date:    Wed, 17 Jul 1996 02:23:25 -0700 (PDT)
S:   From:    Terry Gray <gray@cac.washington.edu>
S:   Subject:   IMAP4rev1 WG mtg summary and minutes
S:   To:    imap@cac.washington.edu
S:   cc:    minutes@CNRI.Reston.VA.US, John Klensin <KLENSIN@MIT.EDU>
S:   Message-Id:   <B27397-0100000@cac.washington.edu>
S:   MIME-Version:   1.0
S:   Content-Type:   TEXT/PLAIN; CHARSET=US-ASCII
S:
S:   )
S:   a004 OK FETCH completed
C:   a005 fetch 12 body[text]
S:   * 12 FETCH (BODY[TEXT] {190}
S:   Hi Bob,
S:
S:   Long time no see. Give me a call when you get a chance. In
S:   regards to our last conversion, you were right about
S:   the European Swallows. Can you check the African Swallows?
S:
S:   Bill
S:   )
S:   a005 OK FETCH completed

```
-continued

C:  a006 fetch 13 full
S:  * 13 FETCH (FLAGS (\Seen) INTERNALDATE "17-Jul-1996 02:44:27 -0700"
RFC822.SIZE 4286 ENVELOPE ("Wed, 17 Jul 1996 02:23:25 -0700 (PDT)"
"IMAP4rev1 WG mtg summary and minutes"
(("Terry Gray" NIL "gray" "cac.washington.edu"))
(("Terry Gray" NIL "gray" "cac.washington.edu"))
(("Terry Gray" NIL "gray" "cac.washington.edu"))
((NIL NIL "imap" "cac.washington.edu"))
((NIL NIL "minutes" "CNRI.Reston.VA.US")
("John Klensin" NIL "KLENSIN" "MIT.EDU")) NIL NIL
"<B27397-0100000@cac.washington.edu>")
BODY ("TEXT" "PLAIN" ("CHARSET" "US-ASCII") NIL NIL "7BIT" 3028
92))
S:  a006 OK FETCH completed
C:  a007 fetch 13 body[header.diff] 12
S:  * 13 FETCH (BODY[HEADER.DIFF] 12 {76}
S:  6a
S:  List-Id:   minutes@CNRI.Reston.VA.US
S:  Reply-To:   minutes@CNRI.Reston.VA.US
S:  .
S:  )
S:  a007 OK FETCH completed
C:  a008 fetch 13 body[text.diff] 12
S:  * 12 FETCH (BODY[TEXT.DIFF] {64}
S:  7a
S:
S:  --
S:  Email:   minutes-admin@cnri.reston.va.us to unsubscribe.
S:  .
S:  )
S:  a008 OK FETCH completed
C:  a009 logout
S:  * BYE IMAP4rev1 server terminating connection
S:  a009 OK LOGOUT completed
```

For this example, diff -e was used. However, the difference could be represented in many other ways.

MTU 116 then sends the single message 206 with the differential message to mail client 102. MUA 118 receives the single message 206 with the differential message. Diff assembler 112 assembles the single message 206 with the differential message.

In one embodiment, a diff type protocol is added to mail server 104 so as to return the differences between the two messages 202, 204 that have the same message ID.

Figure 3:
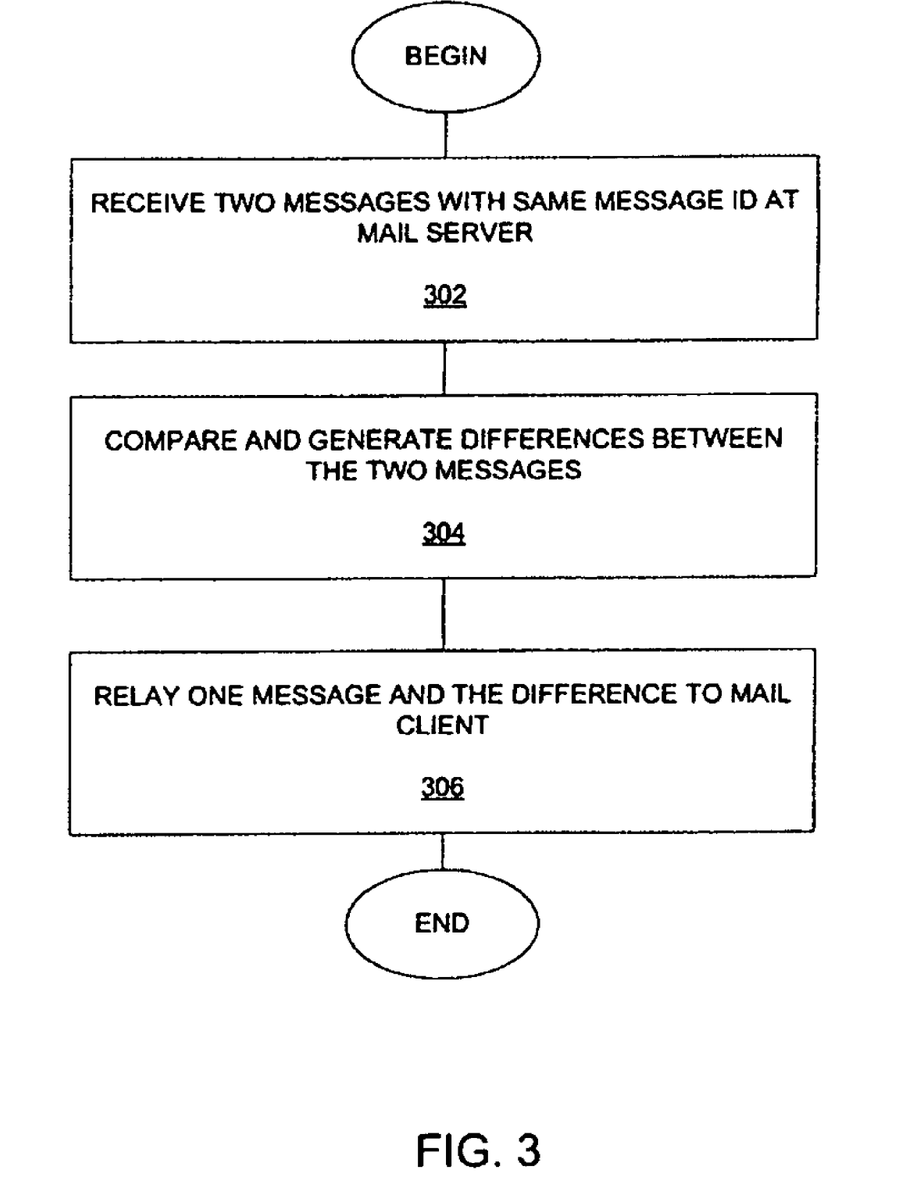
FIG. 3 is a flow diagram illustrating one embodiment of a method for processing two messages with the same message identifier at a mail server.

FIG. 3 is a flow diagram illustrating one embodiment of a method for processing two messages with the same message identifier at a mail server. At 302, a mail server receives two or more messages with the same message ID. At 304, mail server compares the two or more messages, and generates a single message having the same message ID with a differential message based on the comparison of the two or more messages. At 306, mail server delivers the single message with the differential message to a mail client.

Figure 4:
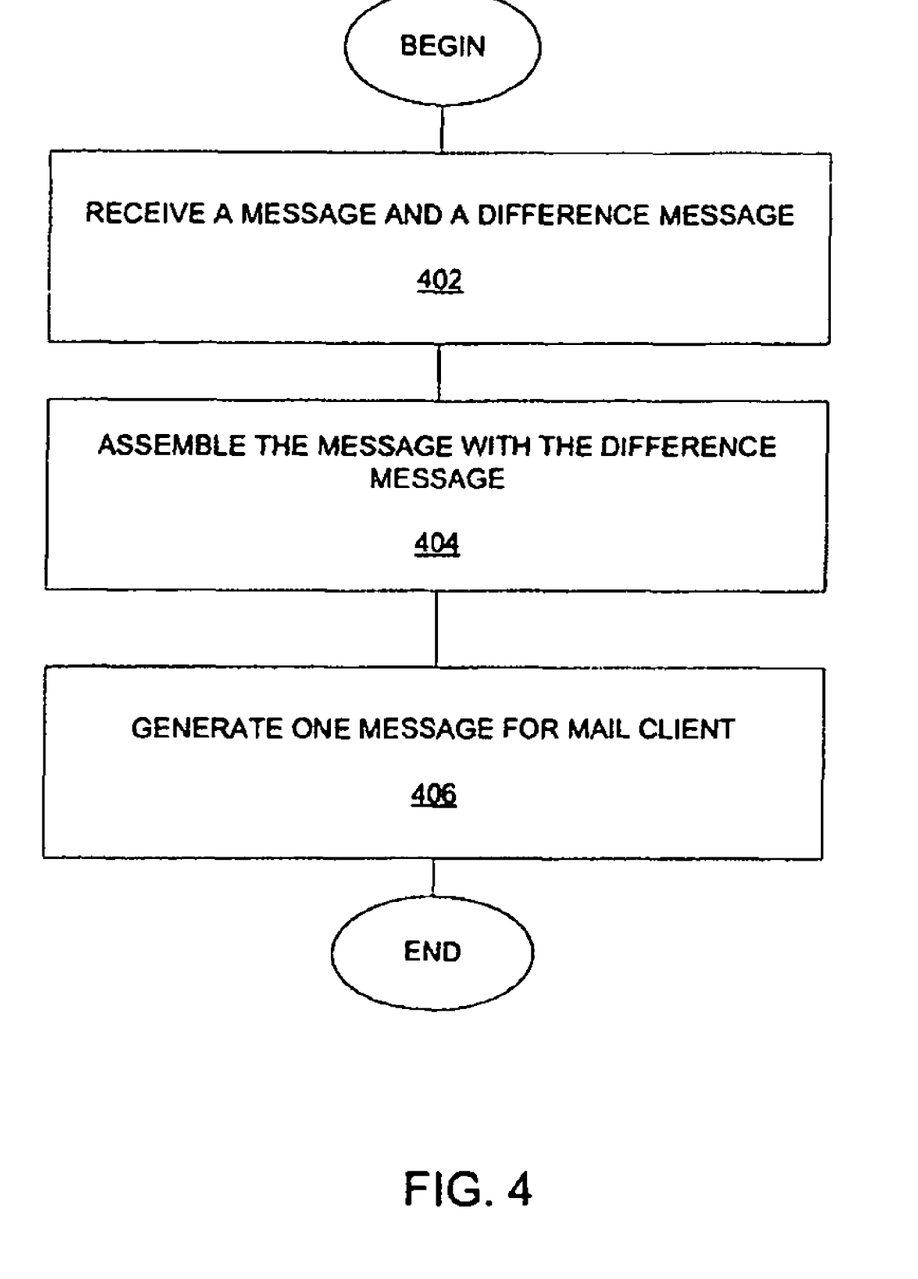
FIG. 4 is a flow diagram illustrating one embodiment of a method for processing a message at a mail client.

FIG. 4 is a flow diagram illustrating one embodiment of a method for processing a message at a mail client. At 402, mail client receives the single message with the differential message. At 404, mail client assembles the single message with the differential message using a diff assembler as described above. At 406, mail client generates the single message for a mail user agent.

Figure 5:
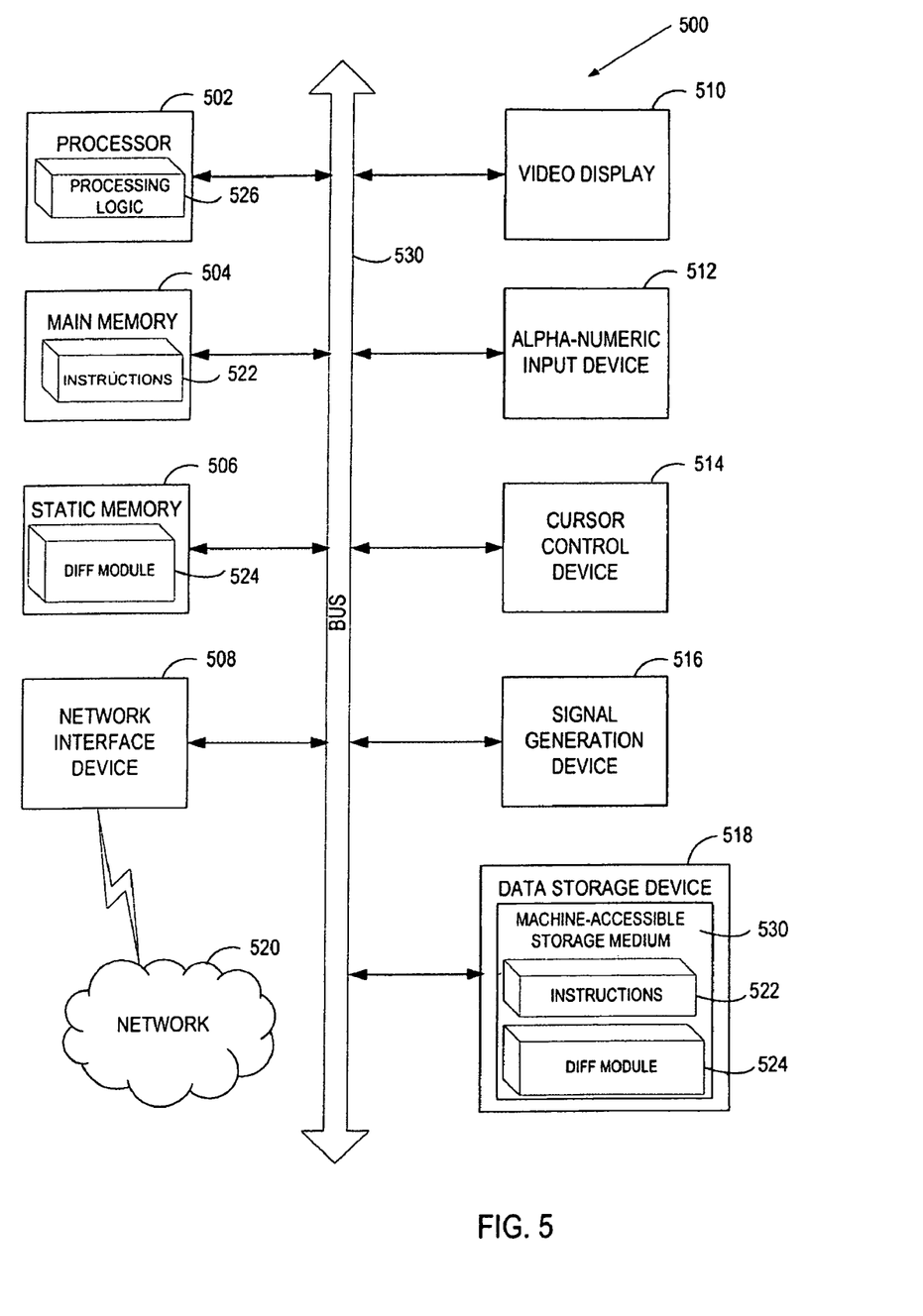
FIG. 5 is a block diagram illustrating an example of a computer system.

FIG. 5 illustrates a diagrammatic representation of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device 502, a main memory 504 (e.g., read-only memory (ROM), flash memory, dynamic random access memory (DRAM) such as synchronous DRAM (SDRAM), a static memory 506 (e.g., flash memory, static random access memory (SRAM), etc.), and a data storage device 518, which communicate with each other via a bus 530.

Processing device 502 represents one or more general-purpose processing devices such as a microprocessor, central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 502 may also be one or more special-purpose processing devices such as an application specific integrated circuit (ASIC), a field programmable gate array (FPGA), a digital signal processor (DSP), network processor, or the like. The processing device 502 is configured to execute the processing logic 526 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a machine-accessible storage medium 530 on which is stored one or more sets of instructions (e.g., software 522) embodying any one or more of the methodologies or functions described herein. The software 522 may also reside, completely or at least partially, within the main memory 504 and/or within the processing device 502 during execution thereof by the computer system 500, the main memory 504 and the processing device 502 also constituting machine-accessible storage media. The software 522 may further be transmitted or received over a network 520 via the network interface device 508.

The machine-accessible storage medium 530 may also be used to store the diff module 524 as presently described. The diff module 524 may also be stored in other sections of computer system 500, such as static memory 506.

While the machine-accessible storage medium 530 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, and carrier wave signals.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method comprising:
receiving messages at a mail server operating on a server machine, wherein the mail server comprises a Internet Message Access Protocol (IMAP) server to allow a user to keep messages on the mail server and to provide real time updates of the user's messages to a mail client, wherein the IMAP server utilizes a diff type protocol to call to a file comparison utility that returns differences between messages having same message identifiers;
determining, by the mail server, that at least two of the messages have a same message identifier, wherein the at least two messages are redundant messages and each of the at least two redundant messages have at least one of a different header or a different message body;
comparing, by the IMAP server, the at least two messages to determine differences between the at least two redundant messages;
generating, by the IMAP server, a single message having the same message identifier and a differential message that identifies the differences based on the comparison of the at least two messages; and
delivering, by the mail server, the single message with the differential message to the mail client.

2. The computer-implemented method of claim 1 wherein the mail server includes a POP server that utilizes the diff type protocol to call the file comparison utility that returns differences between messages having same message identifiers.

3. The computer-implemented method of claim 1 further comprising assembling the single message with the differential message at the mail client to generate one message for the mail client.

4. A mail server machine comprising
a processing device comprising:
a message transfer agent configured to receive, deliver, and store messages, wherein the message transfer agent uses an Internet Message Access Protocol (IMAP) server to allow a user to keep message on the mail server machine and to provide real time updates of the user's messages to a mail client, wherein the IMAP server utilizes a diff type protocol to call a file comparison utility that returns differences between messages having same message identifiers, and wherein the message transfer agent is configured to determine that at least two messages have a same message identifier, and wherein the at least two messages are redundant message and each of the at least two redundant messages have at least one of a different header or a different message body; and
the file comparison utility coupled to the message transfer agent module, the file comparison utility configured to compare the at least two messages to determine differences between the at least two redundant messages, and to generate a single message having the same message identifier and a differential message that identifies the differences based on the comparison of the at least two messages, and wherein the message transfer agent is configured to deliver the single message and the differential message to the mail client.

5. The mail server of claim 4 wherein the message transfer agent uses a POP to utilize the diff type protocol to call the file comparison utility that returns differences between messages having same message identifiers.

6. The mail server of claim 4 wherein the mail client is configured to assemble the single message with the differential message to generate one message for the mail client.

7. A non-transitory computer-accessible storage medium including data that, when accessed by a computer, cause the computer to perform a method comprising:
receiving messages at a mail server operating on a server machine, wherein the mail server comprises a Internet Message Access Protocol (IMAP) server to allow a user to keep messages on the mail server and to provide real time updates of the user's messages to a mail client, wherein the IMAP server utilizes a diff type protocol to call to a file comparison utility that returns differences between messages having same message identifiers;
determining, by the mail server, that at least two of the messages have a same message identifier, wherein the at least two messages are redundant messages and each of the at least two redundant messages have at least one of a different header or a different message body;
comparing, by the IMAP server, the at least two messages to determine differences between the at least two redundant messages; and
generating, by the IMAP server, a single message having the same message identifier and a differential message that identifies the differences based on the comparison of the at least two messages; and
delivering, by the mail server, the single message with the differential message to the mail client.

8. The non-transitory computer-accessible storage medium of claim 7 wherein the mail server includes a POP server, wherein the POP server utilizes the diff type protocol to call to the file comparison utility that returns differences between messages having same message identifiers.

9. The non-transitory computer-accessible storage medium of claim 7 further comprising assembling the single message with the differential message at the mail client to generate one message for the mail client.

* * * * *